United States Patent [19]

Sirovich et al.

[11] 4,302,436

[45] Nov. 24, 1981

[54] METHOD OF REGENERATING DISPROPORTIONATED HYDRIDES

[75] Inventors: Bruce E. Sirovich, Naperville; Irwin Ginsburgh, Morton Grove, both of Ill.

[73] Assignee: Standard Oil Company (Indiana), Chicago, Ill.

[21] Appl. No.: 95,591

[22] Filed: Nov. 19, 1979

Related U.S. Application Data

[63] Continuation-in-part of Ser. No. 973,128, Dec. 26, 1978, abandoned.

[51] Int. Cl.$^3$ .......................... C01B 6/00; C01B 6/02; C01B 6/24
[52] U.S. Cl. .................................. 423/644; 423/645; 423/647; 423/648 R
[58] Field of Search .............................. 423/644–648 R

[56] References Cited

U.S. PATENT DOCUMENTS

| | | |
|---|---|---|
| 3,943,719 | 3/1976 | Terry et al. |
| 4,039,023 | 8/1977 | McClaine |
| 4,044,819 | 8/1977 | Cottingham |
| 4,055,962 | 11/1977 | Terry |
| 4,110,425 | 8/1978 | Buhl et al. |

OTHER PUBLICATIONS

Lynch et al., "The Role of Metal Hydrides in Hydrogen Storage and Utilization", 2nd World Hydrogen Energy Conference, Zurich, Switzerland, Aug. 21, 1978.
Yamanaka et al., "J. Chem. Soc. Japan," vol. 8, 1975, pp. 1267–1272.
Cohen et al., "Solid State Communications", vol. 25, 1978, pp. 293–295.
Buschow et al., "Hydrides for Energy Storage", from Proceedings in Geilo, Norway, Aug. 14–19, 1977, pp. 235–249.
Siegman et al. "Physical Review Letters", vol. 40, No. 11, 3 Apr., 1978, pp. 972–975.

*Primary Examiner*—Herbert T. Carter
*Attorney, Agent, or Firm*—Ronald C. Petri; William T. McClain; William H. Magidson

[57] ABSTRACT

Disclosed is a method of restoring the pressure-composition characteristics of a disproportionated hydride comprising removing substantially all hydrogen from said disproportionated hydride and maintaining said hydride in a substantially hydrogen-free environment at a regeneration temperature sufficient to effectuate desired restoration of the hydride's pressure-composition characteristics. Also disclosed are methods of insitu regeneration of hydrides in process applications.

9 Claims, 2 Drawing Figures

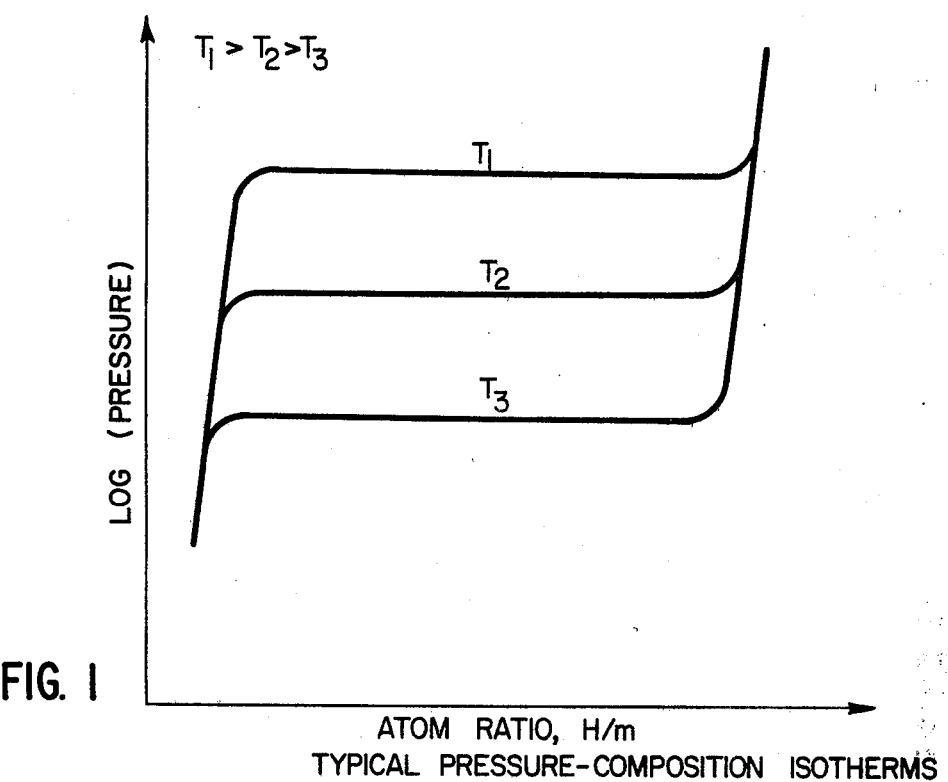
FIG. 1 TYPICAL PRESSURE-COMPOSITION ISOTHERMS
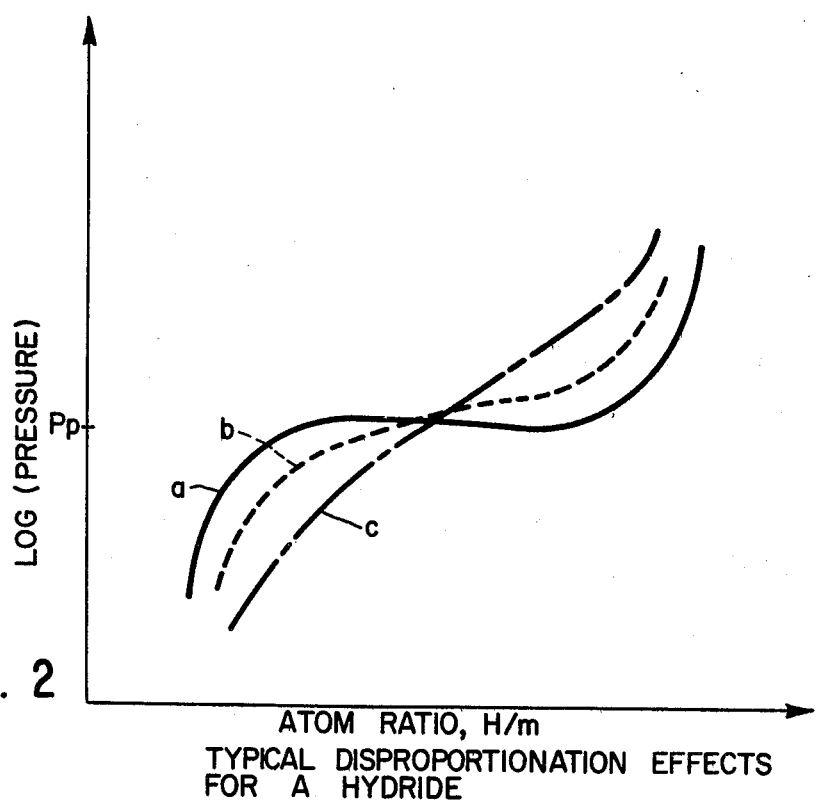
FIG. 2 TYPICAL DISPROPORTIONATION EFFECTS FOR A HYDRIDE

METHOD OF REGENERATING DISPROPORTIONATED HYDRIDES

RELATED APPLICATION

This application is a continuation-in-part of U.S. Ser. No. 973,128 filed Dec. 26, 1978 and now abandoned.

BACKGROUND

This invention relates to a method of reproportionating and restoring desirable properties to a hydride-forming material after a degeneration of these properties has occurred from repeated absorption/desorption cycles. In particular, this invention relates to a method of substantially restoring the original pressure-composition characteristics of hydrides after repeated cycles have caused disproportionation of the material. More particularly, this invention relates to a method of substantially reversing the disproportionation process in hydrides to obtain increased capacity and approximately isobaric behavior over a wide absorption range. This invention also relates to methods of in-situ regeneration of disproportionated hydrides.

Hydrides have the ability to chemically store large quantities of hydrogen in a concentrated form at a variety of temperatures and pressures, and then to release the stored hydrogen at a higher temperature. Numerous hydride-forming materials have been identified, and various hydrides, especially metal hydrides, have recently received considerable attention for potential use in heat and energy conservation schemes. It should be understood that "hydrides" refers generally to hydride-forming materials in both the hydrided and dehydrided states.

Typically, each hydride has an equilibrium temperature which is a function of hydrogen pressure. When the hydride is raised to a temperature greater than the equilibrium temperature and heat is further supplied, the hydride will begin to decompose, giving off previously absorbed hydrogen. Conversely, the hydride will absorb hydrogen when its temperature is lowered and maintained below the characteristic equilibrium temperature of the prevailing hydrogen pressure. Thus, the quantity of hydrogen stored in the hydride can be varied by adjusting the temperature and hydrogen partial pressure in contact with a hydride and supplying or removing heat as appropriate. The materials of primary interest in this context are those which are exothermic absorbers of hydrogen. For these, appreciable quantities of heat are released as the material absorbs hydrogen.

Hydrides that have found most frequent application in the developing fields of heat and energy conservation are predominantly pure metals, metal alloys, or intermetallic compounds which are capable of storing large quantities of hydrogen in the metallic lattice. The amount of hydrogen stored in the lattice can be expressed as the atom ratio H/m, where H is the number of hydrogen atoms and m is the number of metal atoms. A useful characteristic of many hydrides is that the equilibrium pressure for a given temperature is approximately constant for a wide range of absorbed hydrogen concentration during the hydriding or dehydriding cycle. In terms of the atom ratio, this means that graphs of equilibrium pressure versus H/m at given temperature (pressure-composition isotherms) exhibit a nearly flat isobaric "plateau" region over which large quantities of hydrogen may be absorbed/desorbed while the pressure is kept relatively constant.

The equilibrium temperature for a given pressure is not the same for all hydride-forming materials. On the contrary, different hydrides exhibit a wide range of equilibrium temperatures for a given pressure. It is this variation that permits the use of two or more hydrides in combination in heat pumping schemes, for example. For some of the more useful hydrides, higher equilibrium temperatures are generally associated with higher hydrogen pressures.

One of the problems encountered in the use of hydrides, particularly hydrides of metal alloys and intermetallic compounds, is the phenomenon of disproportionation—the degradation or loss of effective hydrogen absorbing capacity of a hydride after a number of absorption/desorption cycles.

Disproportionation is characterized by a reduction in the quantity of hydrogen a given hydride is capable of absorbing (capacity) and a deterioration of the pressure-composition "plateau" characteristics. Hydrides that are preferred in most applications are those that are capable of attaining large values of H/m (display appreciable absorption of hydrogen), and possess pressure-composition isotherms that are substantially isobaric over a large range of H/m values (with large, flat plateau regions). As disproportionation begins to occur, however, the hydride begins to deviate significantly from this isobaric behavior. In practical terms, this generally means that, for a given temperature, the hydrogen pressure needs to be continually increased to maintain continued hydrogen absorption. The concomitant result is loss of efficiency, less favorable kinetics, and in most applications, diminished usefulness of the particular disproportionated hydride.

The interest in hydrides for heat and energy conservation applications has only recently resulted in a recognition of the problem of disproportionation. The literature references to disproportionation are therefore scarce at this time. A paper by F. E. Lynch and E. Snape, "The Role of Metal Hydrides in Hydrogen Storage and Utilization", given at the 2nd World Hydrogen Energy Conference in Zurich, Switzerland, Aug. 21, 1978, cites disproportionation as a major problem yet to be solved.

Other researchers are becoming aware of the problem through empirical observation. In particular, Buschow and Miedema, in a paper entitled "Hydrogen Absorption in Rare Earth Intermetallic Compounds" (delivered at the Hydrides for Energy Storage International Symposium held in Geilo, Norway, Aug. 14–19, 1977, page 235) noted that repeated cycling of ternary hydrides may result in decomposition and loss of capacity. Buschow et al. proposed that regeneration could be achieved by annealing the material in vacuum (page 246). In making this statement, Buschow et al. cited a peper by Cohen et al. ("Degradation of Hydrogen-Absorbing Rare Earth Intermetallics by Cycling," Solid State Commun., 1978, 25 (5), 293) which provides a detailed treatment of the degenerative effects of repeated cycling. Cohen et al. also observe that original $H_2$ absorbing capacity can be restored to $EuRh_2$ by annealing it at 350° C. for 5 hours under vacuum.

Yamanaka et al. ("Hydride Formation of Intermetallic Compounds of Titanium-Iron, Titanium-Cobalt, Titanium-Nickel, and Titanium-Copper," J. Chem. Soc. Japan, 1975, No. 8, 1267–1272) noted that cycling of a hydride of the Ti-Cu system resulted in a compound that displayed x-ray diffraction lines due to TiH$_2$ and copper only—the lines for TiCu or Ti$_2$Cu had disappeared. Degassing the compound at about 850° C. resulted in a return to the original Ti-Cu intermetallic compound.

While researchers are becoming aware of disproportionation and its effects, the art has thus far failed to determine both the definitive general cause of the phenomenon or a general economical solution to its degenerative effects on a hydride. Thus far, one suggested general "solution" to the problem has been to raise the hydride-former to a temperature above its melting point for some length of time. This, of course, is really no solution at all, but rather a remelting and recasting of the hydride-former itself—simply a refabrication of the desired hydride-former from its constituents. This approach is both time consuming and expensive. In addition, reducing the hydride-former to a non-particulate or molten state also introduces handling problems and limitations on where the hydride can be regenerated. It should be noted that all references to the melting point of a hydride are intended to refer to the melting point of the dehydrided (hydrogen-free) hydride-forming material. This distinction is necessary due to the fact that the melting point of a hydrided (hydrogen-rich) material may differ from the melting point of the corresponding dehydrided hydride-former.

In certain specific cases, attempts to regenerate a specific hydride species have involved annealing the hydride at very low or vacuum pressures. The annealing temperature range for most alloys is generally considered to be greater than one-half, and preferably greater than two-thirds, the Kelvin melting point of the alloy. Typically, such a process can involve temperatures in excess of about 700° C., and commonly, in excess of 900° C. Attaining and maintaining such temperatures while simultaneously maintaining vacuum pressures over the hydride bed can be difficult and expensive.

It has been hypothesized that disproportionation is due to the formation of a hydride state which is more stable than the desired hydride state. That is, for a given hydride, there may exist more than one chemical reaction by which hydrogen may be absorbed. While one chemical reaction may form the hydride which possesses desirable pressure-composition characteristics, there may also exist a more thermodynamically favored reaction which forms a hydride with markedly different, and less favorable, characteristics.

For clarity, the postulated disproportionation process is described with reference to a particular alloy, lanthanum-nickel, although it is to be understood that the general descriptions and statements are equally applicable to other metallic and some non-metallic hydrides as well. In the dehydrided (or substantially hydrogen-free) state, the most thermodynamically favored configuration for a useful lanthanum-nickel alloy is LaNi$_5$. The hydride of LaNi$_5$ possesses isotherms with desirable absorption/desorption characteristics (i.e. large capacity and isobaric behavior for a large range of H/m values). The desired hydriding reaction is

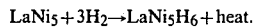

$$LaNi_5 + 3H_2 \rightarrow LaNi_5H_6 + heat.$$

It should also be noted, however, that the formation of elemental lanthanum hydrides or lower nickel content lanthanum-nickel hydrides are thermodynamically more favored reactions in the presence of hydrogen.

There has been considerable speculation among workers in the field concerning the cause of disproportionation. One of the best explanations is that disproportionation occurs as the LaNi$_5$ becomes substantially hydrided (hydrogen rich), and diffusion effects in the lattice cause a highly localized migration or separation of the La and Ni atoms—thus providing a mechanism for the formation of the lower nickel content lanthanum hydride compounds. While this theory is gaining acceptance, the invention described herein is not dependent upon its accuracy and should not be limited thereby.

In theory, as hydrogen enters the lattice, the lattice expands and the hydrogen present makes it thermodynamically more favorable for the nickel and lanthanum to migrate apart (perhaps a distance as small as one or two lattice sites). This effect can be more pronounced at the surface of the hydride. In a very localized region of the lattice, therefore, one would find segregation of the lanthanum and nickel atoms. As segregation begins to occur, lower nickel content lanthanum hydrides begin to form because there is less nickel in the lattice sites immediately adjacent to a given lanthanum atom. This microscopic "diffusion-segregation-low nickel hydride formation" process may begin at the first entry of hydrogen into the lattice and may continue throughout the absorption process. Further, the lower nickel content hydrides are forming simultaneously with the desired hydride, LaNi$_5$H$_6$. Consequently, as the absorption process continues, there will exist a number of hydride species within the given sample of material. This microscopic aggregate of different species would, of course, be expected to exhibit macroscopic pressure-composition characteristics quite different from those expected of the desired species alone.

Some metallic hydrides, magnesium-nickel for example, appear to resist disproportionation at almost all temperatures. In the context of the prevailing theory, such exceptions are explained by the speculation that the desired hydrogen-free alloy remains thermodynamically favored even in the presence of hydrogen. Identification of which hydrides disproportionate is accomplished by routine experimentation.

The diffusion and migration of the distinct atoms within the lattice appears to occur to some degree at all temperatures. The rate of diffusion is, however, observed to increase rapidly with increasing temperature. The disproportionation reaction therefore appears to be a thermally activated phenomenon, (accelerating with increasing temperature) providing hydrogen is present to cause the thermodynamics to favor the formation of alternative hydrides. Frequently, the higher the temperature at which a given hydride absorbs hydrogen, the greater the disproportionation occurring during the absorption, and the larger the corresponding degeneration in absorption plateau characteristics.

The alteration of the pressure-composition characteristics of hydrides poses great problems in most applications. Such degradation of capacity in any process application would necessitate continual removal and replacement of the hydride. Any type of application in which the pressure-composition characteristics are expected to be reproducible over a number of cycles would suffer from the gradual change in hydride properties during sustained usage.

There is therefore a need for a new method of reproportionating hydrides so that the original characteristics of a disproportionated hydride are substantially restored. In particular, there is a need for a solution to the disproportionation problem that is easier, less expensive, less time consuming and requires less specialized equipment than the current art solution of either literally melting the hydride down and re-fabricating it from its constituents or annealing the hydride at high temperatures and vacuum pressures. Moreover, for anticipated commercial applications of hydrides, there is a need for an on-line or in-situ method of regenerating hydrides.

The general object of this invention is to provide a method of reproportionating a hydride to substantially restore the hydride's original pressure-composition characteristics. Another object of this invention is to provide a method of reproportionating a hydride at a temperature below the melting and annealing temperatures of the hydride. Another object of this invention is to reproportionate a hydride under conditions less severe in pressure, temperature and duration than those required to originally fabricate or anneal the hydride. A further object of this invention is to provide a method of reproportionating a hydride without reducing the hydride to a molten or non-particulate state. Still another object of this invention is to provide a method of reproportionating a hydride which can be practiced in-situ—without the need to interrupt the operation of the process in which the hydride is being used. Still other objects of this invention will become apparent to those skilled in the art after consideration of the drawings and following descriptions.

SUMMARY OF THE INVENTION

It has been unexpectedly found that the pressure-composition characteristics of a disproportionated hydride can be restored by a method which comprises removing substantially all hydrogen from said disproportionated hydride, and maintaining said hydride in a substantially hydrogen-free environment at a regeneration temperature sufficient to bring about desired restoration of the hydride's pressure-composition characteristics without melting the hydride, and thereafter exposing the hydride to hydrogen to promote absorption. A significant and surprising aspect of this method is that the objects of this invention can be achieved at temperatures which are, in general, significantly lower than the melting point, and in many cases, significantly below the annealing temperature of the hydride. Another significant aspect is that the removal of substantially all hydrogen from the disproportionated hydride can be accomplished for some hydride species even at high pressures. The basic requirement is that the hydrogen partial pressure over the hydride be low as compared to the equilibrium pressure for that hydride at the prevailing temperature.

As this invention provides a means of reproportionating a hydride without the need for extremely high temperatures, regeneration can now be accomplished in-situ. Process applications of hydrides frequently require the hydride in a specific form: particulate, granulated, finely divided, solid, supported or slurried, for example. A method of reproportionation which involves melting the hydride would have the disadvantage that it also necessitates removing the hydride from its reactor vessel and processing the hydride back into a useful form after reproportionation. An annealing process at vacuum pressures is also impractical as the need for a controlled cooling rate and low pressures would necessitate delay and specialized equipment.

In some applications, slurry agents, as well as binding or form-retaining agents, such as that disclosed in U.S. Pat. No. 4,110,425 to Buhl and Will (incorporated herein by reference), are used in conjunction with a hydride. In such cases, regeneration can still be accomplished by simply regenerating at a temperature high enough to initiate and sustain reproportionation, but below the melting point or decomposition temperature of the particular special purpose agent in use. Regeneration in these cases would be virtually impossible, or at least extremely difficult, by the prior art methods. By the prior art melting method it would be necessary to completely separate the hydride from the agent so that subsequent melting and reprocessing would not incorporate the agent into the hydride itself as a contaminant. Separation of the agent may also be necessary in the annealing process to avoid decomposition or boil-off from the high annealing temperatures, or vacuum pressures.

Regardless of the form of the hydride, however, the method of this invention accomplishes regeneration of the hydride without materially altering its form. Thus, the usual problems connected with handling, containing and transporting molten or aglommerated material can be circumvented by the method of this invention. Further, this invention obviates the need to remove the hydride from its reactor vessel to separate the hydride from any special purpose agent, or to reprocess the hydride after reproportionation. Consequently, the method of this invention makes it unnecessary to interrupt the operation of the particular process in which the hydride is being used, and also provides a means of regenerating a hydride without the specialized heating, melting and processing apparatus generally required to fabricate and prepare the hydride. Moreover, after reproportionation by the method of this invention, it is unnecessary to perform the sometimes costly and time-consuming process of activating the hydride-former. Specifically, reproportionation without alternation of the form of the hydride eliminates the need to repetitiously charge the hydride with hydrogen to obtain optimum surface area characteristics.

In one aspect, in-situ regeneration of a disproportionated hydride can be achieved by maintaining at least one more hydride bed than the number normally needed for operation of the particular process application. At least one disproportionated hydride bed is then reproportionated in a regeneration zone while at least one of the remaining beds remains in use in the process application. Periodically interchanging the roles of the beds maintains a constant supply of regenerated hydride to the process.

In another aspect, in-situ regeneration can be achieved by configuring the hydride (on a substrate or support for example) in such a way that at least one segment of the surface area of the hydride is in contact with a regeneration zone while at least one other segment is kept in contact with a reaction zone of the process. Periodic movement of the hydride to reverse the roles of the two segments maintains a constant supply of regenerated hydride to the process.

It is understood that the term "hydride bed" as used herein, and particularly in connection with the in-situ regeneration aspects described above, is not intended to be limited to stationary or static beds with well-defined boundaries. The term is intended to also include moving bed systems wherein the hydride is, for example, slurried, fluidized, or disposed on or in a discrete or continuous transport medium.

Generally speaking, this invention can be useful in regenerating any hydride that experiences disproportionation. As most metallic hydrides undergo disproportionation to some degree, this invention is most suitable for regenerating hydrides of mixtures of metals, intermetallic compounds and metal alloys. As some non-metallic hydrides can also experience a form of disproportionation, the method of this invention can also be useful in helping to regenerate disproportionated non-metallic hydrides as well.

Although a wide number of hydrides can be regenerated by the instant process, many of the hydrides useful in this invention have the formula $$A_xB_y,$$

where A comprises at least one component which exothermically forms hydrides, B comprises at least one non-hydride forming component, and x and y need not be integers, wherein the heat of formation of the hydride of $A_xB_y$ is less than the heat of formation of the hydride of A alone.

Most commonly, A comprises at least one component from the group consisting of calcium and all elements of the rare earth series and B comprises at least one component selected from the group consisting of nickel, iron, cobalt and aluminum. In this case, the most useful hydrides are those in which x is about 1, and y is about 4 or 5.

Suitable hydrides useful in this invention having the formula $A_xB_y$ include, but are not limited to, metallic hydrides such as lanthanum-nickel, calcium-nickel, titanium-iron-nickel, titanium-nickel, titanium-iron, lanthanum-nickel-aluminum, mischmetal-nickel-iron, mischmetal-nickel, mischmetal-calcium-nickel, samarium-cobalt and mixtures thereof. Of these hydrides, those composed of more than one metallic constituent can take the form of alloys or intermetallic compounds. Consequently, mixtures, alloys and intermetallic compounds of these multiple-constituent compositions (whether in alloy or intermetallic compound form) can be used in this invention. For example, a mixture of an alloy of lanthanum-nickel and an intermetallic compound of calcium-nickel can be regenerated in accordance with the method of this invention. Suitable hydrides useful in this invention (i.e. some examples of hydrides which undergo some disproportionation in use) can also be found in U.S. Pat. Nos. 4,055,962 (Terry), 4,044,819 (Cottingham), 4,039,023 (McClaine), and 3,943,719 (Terry et al), all of which are incorporated herein by reference. These useful hydrides possess plateau regions which are substantially isobaric for a range of H/m of about 0.10 or greater. Such hydrides can be made to absorb or desorb large quantities of hydrogen at fixed temperature and pressure by merely controlling the flow of heat and hydrogen into the vicinity of the material. Hydrides which exhibit such desirable plateau characteristics and are especially suitable for use in this invention are calcium-nickel, lanthanum-nickel, titanium-iron, titanium-nickel, and mixtures thereof.

The method of this invention can also be carried out in step-wise fashion—a series of short, partial regeneration runs—or in one sustained run, without materially affecting the overall degree of regeneration.

BRIEF DESCRIPTION OF THE DRAWINGS

FIG. 1 is a schematic diagram of typical pressure-composition isotherms for a hydride.

FIG. 2 is a pressure-composition diagram showing typical disproportionation effects.

DETAILED DESCRIPTION OF THE INVENTION

FIG. 1 presents an idealized diagram of generally typical isotherms for a preferred hydride suitable for use in heat pumps, pressure pumps and the like. These materials possess isobaric equilibrium, or plateau, regions in which, for a given equilibrium temperature, the equilibrium pressure is substantially constant over a wide range of hydrogen concentration.

It should be understood that it is the partial pressure of hydrogen, not the total pressure, which is plotted in diagrams such as FIG. 1. As used herein, all pressures refer to partial pressure of hydrogen unless otherwise indicated. Further, the term "hydride" is meant to refer generically to materials capable of absorbing and desorbing hydrogen. This term is used to refer to such materials in both the hydrided and dehydrided states. The term "hydrogen" is meant to include all isotopes of hydrogen including, for example, deuterium and tritium.

FIG. 2 graphically portrays the empirical effects of disproportionation on the isotherms of a typical hydride. All three curves of FIG. 2 are isotherms for the same hydride at temperature $T_1$. Curve (a) is the isotherm for this hydride in its original state shortly after activation (the initial repetitious charging with hydrogen required to attain desirable capacity and kinetics). After a number of absorption/desorption cycles, the isotherm for this hydride at $T_1$ degenerates to curve (b). Curve (b) demonstrates that the plateau region becomes smaller, exhibiting a definite slope and spanning a narrower range of hydrogen concentration. This causes the hydride to absorb less hydrogen at the plateau pressure. The capacity of the hydride, and its usefulness in many applications, has thereby diminished. In extreme cases, the pressure-composition curve for a hydride may degenerate to curve (c)—exhibiting virtually no plateau region and destroying the hydride's utility.

The method of this invention substantially reverses the effects of disproportionation, however. The method involves removing substantially all of the hydrogen from the disproportionated hydride. As noted previously, this can be achieved by maintaining the hydride at a pressure that is small when compared to the equilibrium pressure of the particular hydride at the prevailing temperature.

As a practical matter, for some hydride species with low equilibrium pressures, maintaining vacuum pressure over the hydride bed is necessary to cleanse the hydride of hydrogen lodged in the lattice or interstitial spaces. If the low equilibrium pressures of the particular hydride species to be reproportionated dictate that the vacuum system (a cold trapped diffusion pump system, for example) is the method of choice, then an effort should be made to attain pressures as low as practicable to effectuate nearly complete removal of the gas. When using a vacuum system, reproportionation should be carried out at pressures sufficiently low to draw off the hydrogen, with higher efficiency being realized at lower pressures. At high hydrogen flow rates it may be necessary to exercise some care to prevent hydride dust or particles from being pulled from the bed.

For other species with moderate equilibrium pressures, it may be sufficient to merely provide a means of venting the liberated hydrogen to the atmosphere. Certain species can also be cleansed of hydrogen by employing an inert stripper gas (such as argon, neon, or nitrogen, for example) flow through the bed. The stripper gas can then be freed of hydrogen in separate reactor vessels through absorption by other hydrides or other well known hydrogen reclamation techniques.

The precise means by which the hydride bed is cleansed of hyrogen is primarily dependent upon the equilibrium pressure characteristics of the species in question. Optimum methods of removing substantially all hydrogen from a given hydride species can be determined by routine experimentation.

In accordance with the method of this invention the hydride is also heated to, and maintained at, a regeneration temperature sufficient to initiate and sustain reproportionation of the hydride, taking care to maintain a substantially hydrogen-free environment. Within the context of the disproportionation hypothesis noted above, reproportionation is considered to be the process of return migration of constituent atoms within the hydride from segregated (disproportionated) locations back to sites occupied prior to disproportionation or to equivalent sites.

Regeneration temperatures for purposes of this invention are temperatures in the range between the temperature at which reporportionation first begins to occur and approximately the annealing temperature of the hydride. More specifically, regeneration temperatures are defined to be lower than the annealing temperature, or alternatively, lower than the temperature at which absorption surfaces of the hydride begin to soften or become molten and non-particulate, whichever is lower. This softening point of the hydride should be particularly avoided in process applications in which the hydride is used in a slurry or in an agitated bed, for example. Upon reaching either a softened or molten form the hydride would tend to agglomerate and present serious mechanical problems. Generally, the onset of reproportionation occurs at temperatures substantially lower than the annealing temperature of the hydride. For purposes herein, references to melting point and annealing temperature should be understood to mean the melting point and annealing temperature, respectively, of hydride-forming material when in a substantially hydrogen-free or hydride-former state.

The length of time required for reproportionation is dependent somewhat upon the particular regeneration temperature employed. In general, the higher the regeneration temperature, the shorter the time required to achieve substantial regeneration. Accordingly, regeneration time for specific hydrides can vary from the order of a few minutes at very high regeneration temperatures (near the hydride annealing temperature) to a number of hours at very low regeneration temperatures (near the onset of reproportionation).

In practice, pressure-composition curves can be plotted after each reproportionation attempt to ascertain whether the hydride's original capacity and plateau characteristics are returning. The temperature and heating time are preferably increased until one sustained reproportionation period is sufficient to restore substantially all of the hydride's capacity—although a sequence of shorter, lower temperature reproportionation periods may also obtain similar regeneration results for a particular hydride.

Optimum temperature and time parameters for any particular hydride can be determined by routine experimentation. It is known, for example, that $CaNi_5$ can be regenerated by heating to a temperature in the range of about 350° C. to about 550° C. for between about 20 and 30 hours. As an additional example, $LaNi_5$ can be regenerated by heating to a temperature in the range of about 150° C. to about 350° C. for between about 15 and 30 hours or to about 400° C. for about 1 hour. Different temperature and time combinations may also be successful in regenerating these hydrides. For both $CaNi_5$ and $LaNi_5$, regeneration can be accomplished with the partial pressure of hydrogen over the hydride bed during the period of reproportionation lower than about 2 torr, while $LaNi_5$ can also be reproportionated at pressures as high as 150 psi, although this pressure necessitates a longer heating period.

In practice, the steps of removing the hydrogen and heating the hydride can be performed either sequentially or simultaneously. That is, a vacuum system can be pumping on the bed, for example, at the same time the hydride is being brought to a regeneration temperature. In this way, the rise in temperature will enhance hydrogen desorption from the hydride and facilitate the removal of the hydrogen. Alternatively, substantially all of the hydrogen can be removed from the hydride prior to bringing the hydride to a regeneration temperature.

Moreover, reproportionation need not be accomplished in one sustained regeneration run. As a practical matter, maintaining the necessary temperature and pressure conditions for the required period of time may be inconvenient. In this event, a series of short reproportionation runs can be performed. Each run in such a series is shorter than the time required for full regeneration and therefore achieves only fractional regeneration of the hydride. The full series, however, can achieve substantially the same total regeneration as one sustained run. The time delay between individual runs in the series is preferably small, but can be large if care is taken to maintain a substantially hydrogen-free environment for the hydride in the interim.

Significant advantages which accrue to this invention are its simplicity and the speed with which reproportionation takes place. Reproportionation by this method can generally be accomplished in a time substantially shorter than the time required to remelt, recast, process and reactivate a hydride. This fact, combined with the fact that reproportionation can be accomplished at temperatures generally well below the melting and annealing points of the hydride, makes this reproportionation method uniquely useful.

In particular, reproportionation can now be accomplished in-situ—without the need to interrupt the operation of the process in which the hydride is being used. In any process application in which the hydride will degrade with time due to disproportionation, it will be necessary to regenerate the hydride either periodically or continuously to maintain operation. Schemes providing for in-situ regeneration of disproportionated hydrides without interruption of operation will no doubt improve efficiency and reduce "down time" of the process. Once such scheme would involve the use of at least one more hydride bed (each, for example, in a separate reactor) than the number of beds ordinarily required for operation of the process application. At least one bed therefore undergoes reproportionation in a regeneration zone at all times while all or some of the remaining beds are employed in the process. The roles of the beds are then periodically interchanged as needed to insure a continual supply of regenerated hydride to the process.

Another method of continually regenerating a disproportionated hydride involves configuring the hydride (i.e. disposing, shaping, or processing the hydride) in a particularly useful way. The hydride bed is configured (on a substrate or support, for example) such that at least one segment of the hydride surface area is in contact with an active reaction zone of the process. At least one other segment of the surface area of the hydride is in contact with a regeneration zone. The hydride is periodically moved to reverse the roles of at least two of the hydride segments such that a regenerated segment comes in contact with the process reaction zone and a disproportionated segment then enters the regeneration zone. A continual supply of regenerated hydride to the process is thereby attained.

The "regeneration zone" referred to above can simply be a reaction zone in which the hydride can be cleansed of hydrogen, maintained in substantially hydrogen-free conditions at the regeneration temperature sufficient to effectuate desired restoration of the particular hydride's pressure-composition characteristics without melting the hydride, and thereafter exposed to hydrogen to promote absorption. The support or substrate can be of any material that is capable of withstanding the regeneration temperatures and pressures for the particular hydride, and still maintain support for the hydride in some stable configuration. This support can be solid or porous and can even be another hydride species. It should also be noted that the descriptions provided herein for in-situ regeneration of a disproportionated hydride apply equally well to processes operated in either continuous or batch modes, and to either fixed or moving bed configurations.

The specific examples below serve to illustrate the dramatic regenerative effects of the invention.

EXAMPLE I

A 113.73 gram sample of $CaNi_5$ was placed in a stainless steel reactor and activated. After taking some preliminary absorption/desorption data and running some brief hydrogen pumping applications, an initial pressure-composition isotherm was taken.

Initial run

The average internal temperature of the reactor during the isotherm was 68.9° C. This temperature was calculated by taking the average of four heat sensors located within the reactor and hydride bed. (All subsequent temperatures reported herein were obtained in the same manner.) The initial run was made over a period of 9 hours, with data points taken at convenient intervals.

Plateau characteristics

The plateau was very flat, having a slope of 0.015 (less than about 1°). (All such reported slopes are based upon an arbitrary scale and are provided here only for the purpose of comparing the initial, disproportionated, and reproportionated hydride plateaus.)

The plateau pressure was graphically found to be about 31.3 psia.

The absorption capacity of the sample at the plateau pressure (i.e., how much hydrogen the sample could absorb with the pressure constant at about 31.3 psia) was graphically found to be approximately 8 liters of hydrogen.

This sample was then used for approximately 1 week during which it underwent 5 absorption/desorption cycles. The first cycle was at 49° C., followed by three at 69° C. and the last at 100° C.; the cycle time ranged from about 20 to about 75 hours; the pressure excursions were from about 3 psia to about 2000 psia. At the end of that time, reduced capacity became noticeable and a pressure-composition isotherm was taken to determine the extent of disproportionation.

After disproportionation

The average internal temperature was 68.8° C. for an isotherm of about 7.5 hours.

Plateau characteristics

The plateau had almost completely disappeared, having a slope of 0.53 (about 28°) over the same 8 liter absorption range as the plateau of the Initial Run.

The absorption capacity of the sample at the Initial Run plateau pressure (about 31 psia) was reduced from about 8 liters to about 0.2 liters of hydrogen.

Reproportionation

The sample was heated to an average internal temperature of 233.1° C. for approximately 92 hours. A cold trapped diffusion pump system was employed to maintain very low pressure over the hydride bed to effectuate removal of substantially all of the hydrogen from the hydride. The vacuum system was capable of attaining an ultimate vacuum of $10^{-6}$ torr, had a capacity of about 170 liters/sec, and pumped thru a tube-and-valve system leading to the hydride reactor having a flow coefficient ($C_v$) of about 0.04. All pressure readings were taken from a gauge on a free flowing manifold located between the pump system and the reactor. These dynamic readings therefore represent a lower bound of the actual hydrogen partial pressure immediately over the hydride bed. The pressure reading was $1 \times 10^{-4}$ torr initially and $2 \times 10^{-5}$ torr at the completion of the run.

The reactor was then cooled, and a pressure-composition isotherm was taken. Slight regeneration of the plateau region was observed, evidenced by a smaller slope; but the absorption capacity at the original plateau pressure was only about 1 liter.

The sample was then heated to an average internal temperature at 461.5° C. for an additional 24 hours with the pressure starting at 2 torr and falling to $5 \times 10^{-5}$ torr at the completion of the run. A pressure-composition isotherm was again taken at an average internal temperature of 68.9° C. for 6.75 hours. A definite plateau was again evident.

Plateau characteristics

The plateau pressure was found to be about 32.1 psia.

The plateau was again very flat, having a slope of 0.025 (less than about 2°).

The absorption capacity of the sample at plateau pressure was about 10 liters of hydrogen.

EXAMPLE II

A 161.6 gram sample of $LaNi_5$ was placed in a stainless steel reactor and activated. After taking some preliminary absorption/desorption data and running some brief hydrogen pumping applications, an initial pressure-composition isotherm was taken.

Initial run

The average internal temperature of the reactor during the isotherm was 46.3° C. The run lasted about 19 hours.

Plateau characteristics

The plateau pressure was found to be about 73 psia.
The plateau was flat, having a slope of 0.088 (about 5°).
The absorption capacity of the sample at the plateau pressure was about 18 liters of hydrogen.

The sample was then used for approximately 6 days during which it underwent 12 absorption/desorption cycles. Three cycles were run at about 45° C.; two at about 100° C.; three at about 130° C.; and four at about 150° C. Cycle times ranged from 6 hours to 99 hours with pressure excursions from about 1 psia to about 2000 psia. At the end of that time, reduced capacity was noticeable and a pressure composition isotherm was taken to determine the extent of disproportionation.

After disproportionation

The average internal temperature was 45.8° C. for an isotherm run of about 6.25 hours.

Plateau characteristics

The plateau was now "smeared out" between pressures of 40 and 140 psia.
The plateau pressure had deteriorated to a slope of 0.16 (above about 9°).
The absorption capacity at the plateau pressure was about 15 liters of hydrogen.

Reproportionation

The sample was heated to an average internal temperature of 181° C. for approximately 16 hours and then to a temperature of 220° C. for approximately 6 hours. The same vacuum system as in Example I was again employed. The pressure during the 22 hour period was initially $1.1 \times 10^{-2}$ torr and fell to $4 \times 10^{-3}$ torr at the completion of the run.

The reactor was cooled and a pressure-composition isotherm was then taken at an average internal temperature of 45.6° C. for 7 hours.

Plateau characteristics

The plateau pressure was found to be about 72 psia.
The plateau returned to an almost flat configuration, having a slope of 0.034 (less than about 2°).
The absorption capacity of the sample at plateau pressure was about 20 liters of hydrogen.

EXAMPLE III

A 200 gram sample of $La Ni_5$ which had been stored for two years since its last cycling was placed in a stainless steel reactor and activated. After taking some preliminary absorption/desorption data the sample was heated to about 400° C. for two hours at low pressure. An initial pressure-composition isotherm was then taken.

Initial Run

The average internal temperature of the reactor during the isotherm was maintained between 48° C. and 49° C. The isotherm run lasted about 4 hours.

Plateau Characteristics

The plateau was very flat, having a slope of about 2.6
The plateau pressure was found to be about 87 psia.
The absorption capacity of the sample at the plateau pressure was about 3.1 liters of hydrogen The sample was then used for two days during which it underwent 7 absorption/desorption cycles. These cycles involved temperatures between about −27° C. and about 220° C.; cycle times ranging from a few minutes to about 65 hours; and pressure excursions from about a few psia to over 2000 psia. At the end of that time, reduced capacity became noticeable and a pressure-composition isotherm was taken to determine the extent of disproportionation.

After Disproportionation

The average internal temperature during the isotherm was between 48° C. and 49° C. for an isotherm of about 6 hours.

Plateau Characteristics

The plateau had almost completely disappeared, having a slope of about 22.9 over the same 3.1 liter absorption range as the plateau of the Initial Run.
The absorption capacity of the sample was about 2.5 liters "smeared out" between about 90 and 50 psia.

Reproportionation

The sample was heated to an average internal temperature of 400° C. for about 1 hour. The vacuum system of Examples I and II was again employed.

The reactor was immediately water cooled to about 120° C. and an isotherm lasting about 3 hours at about 48° C. was taken about two hours later.

Plateau Characteristics

The plateau pressure was found to be about 85 psia.
The plateau returned to an almost flat configuration, having a slope of about 3.33.
The absorption capacity of the sample at plateau pressure was about 3 liters of hydrogen.

EXAMPLE IV

The same sample of Example III was then cycled 5 times involving temperatures between about −25° C. and about 155° C.; pressures between about a few psia and about 2000 psia; and cycle times from a few minutes to about 15 hours. The last cycle was run at 155° C. and 2100 psia for almost 16 hours. Reduced capacity was noticeable and an isotherm was taken to determine the degree of disproportionation.

After Disproportionation

The average internal temperature was between 48° C. and 49° C. during an isotherm lasting about 2 hours.

Plateau Characteristics

The plateau was tilted, having a slope of about 10.
The capacity was not severely reduced: the sample showed an absorption capacity of about 2.9 liters; but the plateau was now smeared out between pressures of 63 and 91 psia.

Reproportionation

The sample was heated to about 400° C. for 2 hours and 10 minutes. Instead of maintaining vacuum pressure, however, an overpressure of about 15 psia was maintained during the heating period.

The reactor was then cooled and an isotherm taken at about 48° C. for about 3.5 hours to determine the degree of regeneration.

Plateau Characteristics

The plateau was again flat (slope was about 5.0)
The plateau pressure had returned to about 85 psia.
The absorption capacity was found to be about 3.1 liters.

EXAMPLE V

The same sample of Example IV was then cycled 10 times involving temperatures between about −30° C. and about 150° C.; pressures between a few psia and 2000 psia and cycle times as long as 64 hours. An isotherm was then taken to determine the extent of disproportionation.

After Disproportionation

The isotherm was run with an average internal temperature of about 48° C. for about 2.5 hours.

Plateau Characteristics

The plateau was virtually non-existent; a slight knee in the absorption curve was evident between about 50 and 100 psia.
The absorption capacity over the range of the knee was about 2.6 liters.

Reproportionation

The sample was heated to 400° C. for 2 hours and maintained at a pressure of 15 psia. The reactor was then water-cooled and an isotherm was taken at about 48° C. for about 3.5 hours to determine the degree of regeneration.

Plateau Characteristics

The plateau was again flat (slope was about 5).
The plateau pressure was found to be about 90 psia.
The full capacity of 3 liters had returned.

EXAMPLE VI

The sample of Example V was then cycled quickly 11 times involving temperatures between about −20° C. and about 155° C. and pressures of a few psia to about 2000 psia. The last cycle was done at 155° C. for about 71 hours at 2000 psia. An isotherm was then taken to determine the extent of disproportionation.

After Disproportionation

The isotherm run was performed with an average internal temperature at about 48° C. for about 3.5 hours.

Plateau Characteristics

The plateau had virtually disappeared. A slight knee was evident between about 44 and 68 psia.
The absorption capacity over the range of the knee was about 1.7 liters.

Reproportionation

The sample was heated to 400° C. for 2 hours. The pressure for this reproportionation run was maintained at 150 psia. The reactor was then water cooled and an isotherm was taken at about 48° C. for about 3.5 hours. The resulting absorption curve displayed a plateau that had almost returned to normal. The slope was only slightly larger than the original sample, but the capacity was slightly reduced to about 2.6 liters. Although this was a marked improvement over the disproportionated sample (capacity of 1.7 liters), the sample was reproportionated further for 2 more hours at 400° C. and 150 psia. Another isotherm was then taken at about 48° C. for about 2.5 hours.

Plateau Characteristics

The plateau was very flat with a slope of about 3.5.
The plateau pressure returned to about 95 psia.
The absorption capacity was found to be about 2.8 liters.

As noted, the vacuum pressure readings were dynamic readings from a manifold located between the vacuum pump and the hydride bed. It is expected that the readings during the Example I and Example II runs correspond to partial pressure of hydrogen over the bed less than about 2 torr.

Further examination of the reproportionation runs in the Examples is instructive. After 92 hours at about 233° C., the regeneration of $CaNi_5$ was only marginal. Further heating at about 461° C. for only 24 more hours, however, resulted in dramatic regeneration of the hydride. Thus, the regeneration process appears to be highly temperature dependent. Temperature and the length of time the hydride is heated appear to be related such that increased temperatures result in quicker regeneration. This effect may vary from hydride to hydride, however.

Example III demonstrates the apparent temperature/time relationship more clearly. By raising the temperature during the reproportionation to 400° C., substantial regeneration was accomplished in only one hour. Examples IV, V and VI demonstrate reproportionation of certain hydrides can be accomplished at non-vacuum pressures. Specifically, $La Ni_5$ can be reproportionated at 400° C. in pressures as high as 150 psia, although it is possible that longer reproportionation times may be necessary at higher pressures. It is also significant to note that $Ca Ni_5$, with a melting point of about 1200° C., was regenerated at temperatures no higher than 465° C.; and $La Ni_5$, with a melting point of about 1325° C., was regenerated at temperatures no higher than 220° C. at vacuum pressures, and no higher than 400° C. at 150 psia.

Although certain specific embodiments of the invention have been described herein in order to illustrate the principles of the invention, it is understood that various changes and innovations in the described embodiments can be effected without departure from the basic principles of the invention. Thus, the hypothesis forwarded for the microscopic causes of disproportionation may, in fact, be erroneous in whole or part without negating the fact that the invention described herein is successful in reversing the effects of disproportionation. Therefore, the method of this invention is no way dependent upon the specific description provided herein of the postulated cause of disproportionation. In addition, those skilled in the art will recognize additional schemes for conveniently regenerating a hydride in process applications in-situ without departing from the spirit and scope of this invention.

We claim:

1. An in-situ method of regenerating a disproportionated hydride, wherein said hydride comprises metals, metal alloys or intermetallic compounds, which is being used in a process application comprising
   (a) maintaining at least one more hydride bed than the number normally required for operations of said process, such that at least one disproportionated hydride bed is reproportionated in a regeneration zone while at least one of the remaining beds remains in use in said process;
   (b) removing substantially all hydrogen from said disproportionated hydride, maintaining said hydride in a substantially hydrogen-free environment at a regeneration temperature sufficient to effectuate desired restoration of the hydride's pressure-composition characteristics but below the approximate annealing temperature of the hydride, and thereafter exposing the hydride to hydrogen to promote absorption; and
   (c) periodically interchanging the roles of the beds such that at least one bed reproportionated in step (b) is introduced into the process and at least one disproportionated bed in process use undergoes reproportionation in the regeneration zone of step (b).

2. The method of claim 1 wherein hydrogen of step (b) is removed by introducing inert stripper gas flow through the hydride.

3. The method of claim 1 wherein substantially all hydrogen is removed from the disproportionated hydride prior to maintaining said hydride in a substantially hydrogen-free environment at said regeneration temperature.

4. The method of claim 1 wherein the hydride has the formula $$A_xB_y,$$

where A comprises at least one component which exothermically forms hydrides, B comprises at least one non-hydride forming component, and x and y need not be integers, wherein the heat of formation of the hydride of $A_xB_y$ is less than the heat of formation of the hydride of A alone.

5. The method of claim 1 wherein the hydride comprises at least one component selected from the group consisting of lathanum-nickel, calcium-nickel, titanium-iron-nickel, titanium-nickel, titanium-iron, mischmetal-nickel, mischmetal-calcium-nickel, and samarium-cobalt.

6. The method of claim 1 wherein the hydride comprises at least one component selected from the group consisting of calcium-nickel and lanthanum-nickel.

7. The method of claim 1 wherein said hydride is $LaNi_5$ and reproportionation is carried out at about 15 psia and about 400° C. for about 2 hours.

8. The method of claim 1 wherein said hydride is $LaNi_5$ and reproportionation is carried out at about 150 psia and about 400° C.

9. An in-situ method of regenerating a disproportionated hydride, wherein said hydride comprises metals, metal alloys or intermetallic compounds, which is being used in a process application comprising
   (a) configuring the hydride such that at least one segment of the surface area of the hydride is in contact with a reaction zone of the process and at least one other segment of the surface area of the hydride is in contact with a regeneration zone;
   (b) removing substantially all hydrogen from said disproportionated hydride, maintaining said hydride in a substantially hydrogen-free environment at a regeneration temperature sufficient to effectuate desired restoration of the hydride's pressure-composition characteristics but below the annealing temperature of the hydride and thereafter exposing the hydride to hydrogen to promote absorption; and
   (c) periodically moving the hydride such that at least one regenerated segment of the hydride comes in contact with a reaction zone of the process and at least one disproportionated segment of the hydride enters a regeneration zone.

* * * * *